(12) United States Patent
Jung et al.

(10) Patent No.: US 12,421,631 B2
(45) Date of Patent: Sep. 23, 2025

(54) ADDITIVE FOR THERMAL PRODUCTION AND REINFORCEMENT OF CARBON FIBER, AND CARBON FIBER PREPARED THERE FROM

(71) Applicants: KOREA INSTITUTE OF CARBON CONVERGENCE TECHNOLOGY, Jeonju-si (KR); Board of Regents, The University of Texas System, Austin, TX (US)

(72) Inventors: Min Hye Jung, Jeonju-si (KR); Hyun Kyu Shin, Changwon-si (KR); Kyu Soon Park, Jeollabuk-do (KR); Duck Joo Yang, Flower Mound, TX (US); Benjamin Batchelor, Dallas, TX (US); Samsuddin Mahmood, Dallas, TX (US)

(73) Assignees: Korea Institute of Carbon Convergence Technology, Jeonju-si (KR); Board of Regents, The University of Texas System, Austin, TX (US)

( * ) Notice: Subject to any disclaimer, the term of this patent is extended or adjusted under 35 U.S.C. 154(b) by 935 days.

(21) Appl. No.: 16/611,215

(22) PCT Filed: May 9, 2018

(86) PCT No.: PCT/KR2018/005303
§ 371 (c)(1),
(2) Date: Nov. 5, 2019

(87) PCT Pub. No.: WO2018/208077
PCT Pub. Date: Nov. 15, 2018

(65) Prior Publication Data
US 2020/0165750 A1 May 28, 2020

Related U.S. Application Data

(60) Provisional application No. 62/504,419, filed on May 10, 2017.

(51) Int. Cl.
*D01F 9/22* (2006.01)
*C01B 32/05* (2017.01)
(Continued)

(52) U.S. Cl.
CPC ............... *D01F 9/22* (2013.01); *C01B 32/05* (2017.08); *C08F 220/48* (2013.01); *D01D 5/08* (2013.01); *D01F 1/10* (2013.01); *C08F 2800/20* (2013.01)

(58) Field of Classification Search
CPC .... C08F 220/48; C08F 2800/20; C01B 32/05; D01D 5/08; D01F 1/10
(Continued)

(56) References Cited

U.S. PATENT DOCUMENTS 6,326,451 B1   12/2001  Hamada et al.
2013/0224470 A1*  8/2013  Vautard .................... C08J 5/24
                                                       428/300.1
2014/0346409 A1* 11/2014  Witzel ............... H01B 13/0026
                                                       252/506

FOREIGN PATENT DOCUMENTS

JP        48087120 A   * 11/1973
JP      2008303500 A   * 12/2008
(Continued)

OTHER PUBLICATIONS

Machine Translation of KR 101562510 B1 (Year: 2015).*
(Continued)

*Primary Examiner* — Lynda Salvatore
(74) *Attorney, Agent, or Firm* — Dickinson Wright PLLC; Ross Spencer Garsson

(57) ABSTRACT

The present disclosure relates to an improved method for preparing carbon fiber via modified stabilization and car-
(Continued)

bonization methods during a process of forming filaments of co-polymers comprising acrylonitrile (AN) and vinyl imidazole (VIM) by adding an additive during the during the extrusion process to decrease stabilization temperature, increase crosslinking during oxidation, or decrease the temperatures of carbonization.

15 Claims, 15 Drawing Sheets

(51) Int. Cl.
*C08F 220/48* (2006.01)
*D01D 5/08* (2006.01)
*D01F 1/10* (2006.01)

(58) Field of Classification Search
USPC .......................................................... 428/367
See application file for complete search history.

(56) References Cited

FOREIGN PATENT DOCUMENTS

| | | | |
|---|---|---|---|
| JP | 2016-113726 A | | 6/2016 |
| JP | 2016169252 A | * | 9/2016 |
| KR | 10-2001-0023350 A | | 3/2001 |
| KR | 10-1406119 B1 | | 6/2014 |
| KR | 101562510 B1 | * | 10/2015 |
| WO | WO-2015175050 A2 | * | 11/2015 ............. B29C 48/05 |

OTHER PUBLICATIONS

Machine Translation of JP 2008303500 A (Year: 2008).*
Machine Translation of JP 2016169252 A (Year: 2016).*
Machine Translation of JP 48087120 A (Year: 1973).*
International Search Report for PCT/KR2018/005303 mailed Oct. 31, 2018 from Korean Intellectual Property Office.
Rahaman, M. S. A., et al., "A review of heat treatment on polyacrylonitrile fiber", Polymer Degradation and Stability, 2007. 92(8): p. 1421-1432 ("Rahaman 2007").
Azarova, M. T., et al., "World production and consumption of carbon fibres", Fibre Chemistry, 2011. 42(5): p. 271-277.
Baker, D. A., et al., "Recent advances in low-cost carbon fiber manufacture from lignin", Journal of Applied Polymer Science, 2013. 130(2): p. 713-728.
Batchelor, B. L., et al., "Plasticization for melt viscosity reduction of melt processable carbon fiber precursor", Carbon, vol. 98, Mar. 2016, pp. 681-688.
Paiva, M. C., et al., "UV stabilization route for melt-processible PAN-based carbon fibers", Carbon, 2003. 41(7): p. 1399-1409 ("Paiva 2003").
Bhanu, V. A., et al., "Synthesis and characterization of acrylonitrile methyl acrylate statistical copolymers as melt processable carbon fiber precursors", Polymer, 2002. 43(18): p. 4841-4850 ("Bhanu 2002").
Bortner, M. J., et al., "Shear rheological properties of acrylic copolymers and terpolymers suitable for potentially melt processable carbon fiber precursors", Journal of Applied Polymer Science, 2004. 93(6): p. 2856-2865 ("Bortner 2004").
Cantwell, W. J., et al., "The impact resistance of composite materials—a review", Composites, 1991. 22(5): p. 347-362 ("Cantwell 1991").
Chand, S., "Review Carbon fibers for composites", Journal of Materials Science, 2000. 35(6): p. 1303-1312 ("Chand 2000").
Deng, W., et al., "Poly (acrylonitrile—co -1-vinylimidazole): A new melt processable carbon fiber precursor", Polymer, 2011. 52(3): p. 622-628 ("Deng 2011").
Rangarajan, P., et al., "Effect of comonomers on melt processability of polyacrylonitrile", Journal of Applied Polymer Science, 2002. 85(1): p. 69-83 ("Ramgarajan I 2002").
Rangarajan, P., et al., "Dynamic oscillatory shear properties of potentially melt processable high acrylonitrile lerpolymers", Polymer, 2002. 43(9): p. 2699-2709 ("Ramgarajan II 2002").
Edie, D. D., "The effect of processing on the structure and properties of carbon fibers Carbon", 1998. 36(4): p. 345-362 ("Edie 1998").
Eng, F. P., et al., "Fourier transform infrared studies on the thermal degradation of polyvinylimidazoles: Part I", Journal of Applied Polymer Science, 1986. 32(5): p. 5021-5034 ("Eng 1986").
E.P.A. and D.O.T., 2017 and later model year light- duty vehicle green house gas emissions and corporate average fuel economy standards, 2012, Federal Register. p. 62623-63200 ("EPA 2012").
Fu, Z., et al., "Structure evolution and mechanism of polyacrylonitrile and related copolymers during the stabilization", Journal of Materials Science, 2014. 49(7): p. 2864-2874 ("Fu I 2014").
Fu, Z., et al., "Effects of an itaconic acid comonomer on the structural evolution and thermal behaviors of polyacrylonitrile used for polyacrylonitrile-based carbon fibers", Journal of Applied Polymer Science, 2014. 131(19): p. N/a-n/a ("Fu II 2014").
Godshall, D., et al., "Incorporation of methyl acrylate in acrylonitrile based copolymers: effects on melting behavior", Polymer, 2003. 44(15): p. 4221-4228 ("Godshall 2003").
Guigon, M., et al., "Heat-treatment of high tensile strength PAN-based carbon fibres: Microtexture, structure and mechanical properties", Composites Science and Technology, 1986. 27(1): p. 1-23 ("Guigon 1986").
Jain, M., et al., "Conversion of acrylonitrile-based precursor fibres to carbon fibres", Journal of Materials Science, 1987. 22(1): p. 278-300 ("Jain 1987").
Li, W., et al., "Structural features of polyacrylonitrile-based carbon fibers", Journal of Materials Science, 2012. 47(2): p. 919-928 ("Li 2012").
Mukundan, T., et al., "A photocrosslinkable melt processible acrylonitrile terpolymer as carbon fiber precursor", Polymer, 2006. 47(11): p. 4163-4171 ("Mikundan 2006").
Naskar, A. K., et al., "UV assisted stabilization routes for carbon fiber precursors produced from melt-processible polyacrylonitrile terpolymer", Carbon, 2005. 43(5): p. 1065-1072 ("Naskar 2005").

* cited by examiner

ADDITIVE FOR THERMAL PRODUCTION AND REINFORCEMENT OF CARBON FIBER, AND CARBON FIBER PREPARED THERE FROM

TECHNICAL FIELD

The present invention is directed a method for preparing carbon fibers via modified stabilization and carbonization methods.

BACKGROUND ART

Azarova, M. T., et al., *World production and consumption of carbon fibres*. Fibre Chemistry, 2011. 42(5): p. 271-277 ("Azarova 2011").

Baker, D. A., et al., *Recent advances in low-cost carbon fiber manufacture from lignin*. Journal of Applied Polymer Science, 2013. 130(2): p. 713-728 ("Baker 2013").

Batchelor, B. L., et al., *Plasticization for melt viscosity reduction of melt processable carbon fiber precursor*, Carbon, 2016. 98: 681-688 ("Batchelor 2016").

Bhal, O. P., et al., *Carbon Fibers, Third Edition*, in Carbon Fibers, J. B. Donnet, et al., Editors. 1998, Marcel Dekker Inc.: New York. p. 1-84 ("Bhal 1998").

Bhanu, V. A., et al., *Synthesis and characterization of acrylonitrile methyl acrylate statistical copolymers as melt processable carbon fiber precursors*. Polymer, 2002. 43(18): p. 4841-4850 ("Bhanu 2002").

Bortner, M. J., et al., *Shear rheological properties of acrylic copolymers and terpolymers suitable for potentially melt processable carbon fiber precursors*. Journal of Applied Polymer Science, 2004. 93(6): p. 2856-2865 ("Bortner 2004").

Cantwell, W. J., et al., *The impact resistance of composite materials—a review*. Composites, 1991. 22(5): p. 347-362 ("Cantwell 1991").

Chand, S., *Review Carbon fibers for composites*. Journal of Materials Science, 2000. 35(6): p. 1303-1312 ("Chand 2000").

Deng, W., et al., *Poly (Acrylonitrile-co-l-Vinylimidazole): A New Carbon Fiber Precursor: Melt Processable and Thermally Crosslinkable Carbon Fiber Precursor*, 2012: LAP Lambert Academic Publishing ("Deng 2012").

Deng, W., et al., *Poly (acrylonitrile co-1-vinylimidazole): A new melt processable carbon fiber precursor*. Polymer, 2011. 52(3): p. 622-628 ("Deng 2011").

Deng, W., et al., Polym Prepr (Am Chem Soc Div Polym Chem), 2009. 50: p. 237("Deng 2009").

Edie, D. D., *The effect of processing on the structure and properties of carbon fibers* Carbon, 1998. 36(4): p. 345-362 ("Edie 1998").

Eng, F. P., et al., *Fourier transform infrared studies on the thermal degradation of polyvinylimidazoles: Part I*. Journal of Applied Polymer Science, 1986. 32(5): p. 5021-5034 ("Eng 1986").

E. P. A. and D. O. T., *2017 and later model year light-duty vehicle greenhouse gas emissions and corporate average fuel economy standards*, 2012, Federal Register. p. 62623-63200 ("EPA 2012").

Fu, Z., et al., *Structure evolution and mechanism of polyacrylonitrile and related copolymers during the stabilization*. Journal of Materials Science, 2014. 49(7): p. 2864-2874 ("Fu I 2014").

Fu, Z., et al., *Effects of an itaconic acid comonomer on the structural evolution and thermal behaviors of poly-acrylonitrile used for polyacrylonitrile-based carbon fibers*. Journal of Applied Polymer Science, 2014. 131(19): p. n/a-n/a ("Fu II 2014").

Godshall, D., et al., *Incorporation of methyl acrylate in acrylonitrile based copolymers: effects on melting behavior*. Polymer, 2003. 44(15): p. 4221-4228 ("Godshall 2003").

Guigon, M., et al., *Heat-treatment of high tensile strength PAN-based carbon fibres: Microtexture, structure and mechanical properties*. Composites Science and Technology, 1986. 27(1): p. 1-23 ("Guigon 1986").

Jain, M., et al., *Conversion of acrylonitrile-based precursor fibres to carbon fibres*. Journal of Materials Science, 1987. 22(1): p. 278-300 ("Jain 1987").

Li, W., et al., *Structural features of polyacrylonitrile-based carbon fibers*. Journal of Materials Science, 2012. 47(2): p. 919-928 ("Li 2012").

Mukundan, T., et al., *A photocrosslinkable melt processible acrylonitrile terpolymer as carbon fiber precursor*. Polymer, 2006. 47(11): p. 4163-4171 ("Mikundan 2006").

Naskar, A. K., et al., *UV assisted stabilization routes for carbon fiber precursors produced from melt-processible polyacrylonitrile terpolymer*. Carbon, 2005. 43(5): p. 1065-1072 ("Naskar 2005").

Paiva, M. C., et al., *UV stabilization route for melt-processible PAN-based carbon fibers*. Carbon, 2003. 41(7): p. 1399-1409 ("Paiva 2003").

Rahaman, M. S. A., et al., *A review of heat treatment on polyacrylonitrile fiber*. Polymer Degradation and Stability, 2007. 92(8): p. 1421-1432 ("Rahaman 2007").

Rangarajan, P., et al., *Effect of comonomers on melt processability of polyacrylonitrile*. Journal of Applied Polymer Science, 2002. 85(1): p. 69-83 ("Ramgarajan I 2002").

Salem, D. R., *Structure Formation in Polymeric Fibers*. 2001: Hanser ("Salem 2001").

Rangarajan, P., et al., *Dynamic oscillatory shear properties of potentially melt processable high acrylonitrile terpolymers*. Polymer, 2002. 43(9): p. 2699-2709 ("Ramgarajan II 2002").

Yang, D. J., et al., International PCT Patent Application Publication No. WO 2015/175050, *Carbon fiber compositions and methods of making*, filed Feb. 14, 2015 and published Nov. 19, 2015 ("Yang '050 PCT Patent Application").

The background art of the present disclosure will be described in reference to above mentioned literatures.

Carbon fibers, because of their excellent mechanical properties with additional good chemical and thermal properties, have attracted interest from the aerospace, sporting goods, automotive, and defense industries [Edie 1998; Bhal 1998; Cantwell 1991; Chand 2000; Li 2012]. Majority of the carbon fibers are manufactured from polyacrylonitrile (PAN) precursor, although small amounts are derived from other sources like pitches (mesophase), lignin, and hydrated cellulose. Pitch based precursors have the advantages of low raw materials cost, low energy requirement for carbon fiber preparation and high carbon yield but their mechanical properties are very poor compared to the PAN based carbon fibers [Azarova 2011; Baker 2013; Rahaman 2007; Salem 2001]. Thus, due to excellent mechanical properties, PAN based precursors are found to be the most appropriate [Rahaman 2007; Fu I 2014].

According to a 2012 U.S. government legislation, the average fuel economy of cars and light trucks for the model year 2017 will be 35.5 mpg and for the model year 2025, 54.5 mpg. [EPA 2012]. Lowering the vehicle weight will be an effective way to achieve higher fuel economy and to reduce greenhouse gas emission. According to studies by the U.S. Department of Energy (DOE), PAN based carbon fiber composites have the potential to reduce the weight of the automotive parts as much as 60% compared to metal parts [Baker 2013]. To use the composites for automotive parts, it requires mechanical properties such as tensile strength of 1.72 GPa and a modulus of 172 GPa [Baker 2013]. However, the current technology for the production of PAN based carbon fibers uses solution spinning process that requires expensive and environmentally hazardous solvents recovery steps. So when the carbon fiber composite parts are used for all car manufacturing, the consumption and recovery of hazardous solvent can create enormous environmental as well as economic problem.

Since, PAN based precursors degrade before they melt, solution spinning (20-30 wt % solution) of the precursors using polar solvent is the typical fiber forming process [Ramgarajan I 2002]. Two thermal treatment stages are required for the conversion of the precursors into carbon fibers. In the first stage, the thermal-oxidative 'stabilization' forms a ladder-like structure at temperatures ranging from 200-300° C. in an oxygen rich environment. The second stage of 'carbonization' is conducted in inert atmosphere usually around 1,000-1,400° C. to form carbon fibers [Cantwell 1991; Rahaman 2007; Jain 1987].

As mentioned above, the solution spinning process is associated with solvent recovery thereby having high processing costs. The replacement of solution spinning process by melt spinning is a major benefit for a cost effective and environmentally friendly carbon fiber production. Melt processable carbon fiber precursors were studied by different researchers. For example, co-monomers such as methyl acrylate (MA), itaconic acid (IA), methacrylic acid (MAA), acryl amide (AM), and acryloyl benzophenone (ABP) were incorporated with PAN but their thermal stabilization was always an issue [Fu I 2014; Ramgarajan I 2002; Ramgarajan II 2002; Bhanu 2002; Bortner 2004; Fu II 2014; Godshall 2003; Mikundan 2006; Naskar 2005; Paiva 2003]. In particular, Pavia 2003 et al. [Paiva 2003] and Naskar et al. [Naskar 2005] studied PAN based melt processable precursor copolymers made with MA and ABP where a UV assisted stabilization was required. In 2011, Deng et al reported the potential of poly(acrylonitrile-co-N-vinylimidazole) (AN/VIM) as a new melt processable carbon fiber precursor [Deng 2012; Deng 2011]. This new AN/VIM copolymer does not need the UV treatment for thermal stabilization and can be processed for stabilization as typical PAN based precursors. Recently, Batchelor et al. reported the melt viscosity reduction for AN/VIM precursor polymer using oligomeric plasticizer where only thermal stabilization was used [Batchelor 2016]. In Yang '050 PCT Patent Application, the present inventors disclosed and taught the preparation of automotive grade carbon fiber from melt processable AN/VIM copolymer.

DISCLOSURE

Technical Problem

In order to solve the above-mentioned problems, an object of the present disclosure is to provide an additive for thermally preparing and enhancing carbon fibers and carbon fibers prepared from the same.

Technical Solution

The present invention incorporate the process disclosed and taught in Yang 050 PCT Patent Application involves the use of synthesized precursors of base copolymer of acrylonitrile (AN) and N-vinylimidazole (VIM), such as in at least a 70:30 ratio by weight in solution (including at a 82:18 ratio respectively in solution). Such synthesis is a radical polymerization with 2,2-azobis(2-methylpropionitrile) (AIBN) as the initiator. This synthesis at an 82:18 ratio has been determined as a preferred possible ratio for creating a melt processable fiber while retaining high strength and high carbon yield for a carbon fiber end product. The raw material is processed via melt spinning at temperatures between 170° C. and 190° C. to form small diameter filaments. In embodiments of the present invention, during the extrusion process, additives can be included to decrease stabilization temperature, increase crosslinking during oxidation, or decrease the temperatures of carbonization. These can also be incorporated post-extrusion during the fiber finish process.

In general, in one aspect, the present invention features a method for formation of fibers of co-polymers that include acrylonitrile and a vinyl imidazole co-monomer. The method includes the steps of combining acrylonitrile with the vinyl imidazole co-monomer to form a co-polymer composition. The method further includes the steps of melt-spinning the composition to form fibers of the composition. The method further includes the steps of annealing the fibers. The method further includes the steps of stabilizing the fibers. The method further includes the steps of carbonizing the fibers. An additive is added during the method and changes a characteristic of the fibers selected from the group consisting of (i) decrease stabilization temperature of the fibers by up to about 50° C. as compared to the stabilization temperature of the fibers, in which the fibers would have had without the additive, (ii) increase crosslinking during oxidation that occurs during the step of stabilizing by up to about 50% as compared to the crosslinking during oxidation, in which the fibers would have had without the additive, (iii) decrease carbonization temperature of the fibers by up to about 200° C. as compared to the carbonization temperature of the fibers, in which the fibers would have had without the additive, and (iv) combinations thereof.

Implementations of the invention may include one or more of the following features.

The additive may be added before or during the melt-spinning step.

The additives may be added in dry blend during powderization and/or palletization.

The additive may include a material selected from the group consisting of peroxides, butylhydroxy toluene (BHT), or butylated hydroxyanisol (BHA).

The additive may be added before extrusion takes place.

The additive may be distributed throughout the inside and outside of the fiber.

The additive may be added after the step of melt-spinning and before or during the step of stabilizing.

The additive may be added by fiber finishing or dip coating the melt-spun fibers with a solution comprising the additive.

The additive may be selected from the group consisting of peroxides or AIBN.

The stabilization temperature of the fiber may be reduced due to the addition of the additive.

The additive may be added after the step of stabilizing and before or during the step of carbonization.

The additive may be added by fiber finishing or dip coating the stabilized fibers.

The additive may be selected from the group consisting of BHT and BHT additives.

The carbonization temperature of the fiber may be reduced due to the addition of the additive.

The step of carbonization may go through completion at a lower temperature due to the addition of the additive.

The fiber formed by the process may have a greater tensile strength due to the addition of the additive.

The step of carbonization may have a temperature profile that comprises an isothermal step.

The additive may include a material selected from the group consisting of organic peroxides, butylhydroxy toluene (BHT), and butylated hydroxyanisol (BHA).

The acrylonitrile may be at least 70 wt % of the composition. The co-monomer may be up to 30 wt % of the composition.

The ratio of acrylonitrile to co-monomer may range from 80 wt %:20 wt % to 70 wt %:30 wt %.

The co-monomer may be selected from 1-vinyl imidazole, 4-vinyl imidazole, 2-vinyl imidazole, and 1-methyl-2-vinyl imidazole.

The method may further include adding a plasticizer. The plasticizer may be an oligomer of acrylonitrile-co-methyl-1-imidazoleacrylate.

The melt spinning may be carried out at 100° C. to 200° C. in an inert atmosphere.

The annealing may be carried out at 100° C. to 150° C. under tension.

The plasticizer may be from 5 wt % to 10 wt % of the composition.

The plasticizer may be an oligomer of acrylonitrile-co-N-imidazole acrylate having a molecular weight ranging from 1,000-2,000 daltons.

The diameter of the fibers may be reduced by repeated drawing during melt spinning.

In general, in another aspect, the present invention features a carbon fiber composition. The carbon fiber composition is made from a copolymer that includes at least 70 wt % of acrylonitrile, up to 30 wt % of a co-monomer, and an additive. The fibers in the carbon fiber composition are melt spun, stabilized, and carbonized and have a diameter ranging to 5-25 microns. The additive changes a characteristic of the fibers selected from the group consisting of (i) decrease stabilization temperature of the fibers by up to about 50° C. as compared to the stabilization temperature of the fibers, in which the fibers would have had without the additive, (ii) increase crosslinking during oxidation that occurs during the step of stabilizing by up to about 50% as compared to the crosslinking during oxidation, in which the fibers would have had without the additive, (iii) decrease carbonization temperature of the fibers by up to about 200° C. as compared to the carbonization temperature of the fibers, in which the fibers would have had without the additive, and (iv) combinations thereof.

In general, in another aspect, the present invention features a carbon fiber composition formed by the above described method.

Implementations of the invention may include one or more of the following features. The carbon fiber composition may include a copolymer of acrylonitrile and a co-monomer that is selected from the group consisting of 1-vinyl imidazole, 4-vinyl imidazole, 2-vinyl imidazole, and 1-methyl-2-vinyl imidazole.

The foregoing has outlined rather broadly the features and technical advantages of the invention in order that the detailed description of the present invention that follows may be better understood. Additional features and advantages of the present invention will be described hereinafter that form the subject of the claims of the present invention.

It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the present invention as set forth in the appended claims.

It is also to be understood that the present invention is not limited in its application to the details of construction and to the arrangements of the components set forth in the following description or illustrated in the drawings. The present invention is capable of other embodiments and of being practiced and carried out in various ways. Also, it is to be understood that the phraseology and terminology employed herein are for the purpose of the description and should not be regarded as limiting.

Advantageous Effects

The present invention provides an improved method for preparing carbon fibers via modified stabilization and carbonization methods.

BEST MODE

The present invention provides an improved method for preparing carbon fiber via modified stabilization and carbonization methods. The present invention incorporate the process disclosed and taught in Yang 050 PCT Patent Application involves the use of synthesized precursors of base copolymer of acrylonitrile (AN) and N-vinylimidazole (VIM).

Improved Melt Spinning of Fibers

Figure 1A:
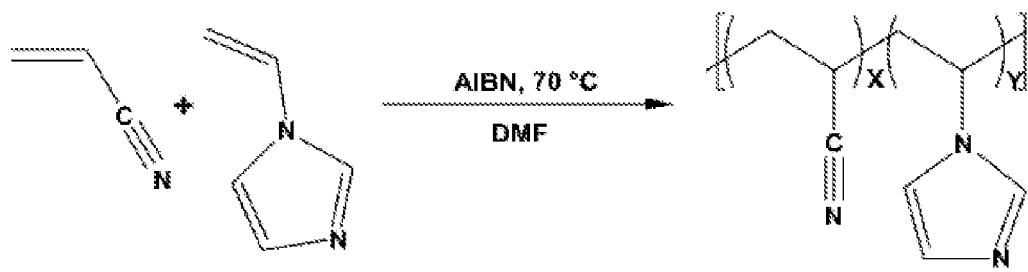
FIG. 1A shows a synthesis scheme of acrylonitrile (AN) and N-vinylimidazole (VIM) to form the copolymer.

Yang '050 PCT Patent Application discloses and teaches various synthesis of AN-based copolymers, including the synthesis of acrylonitrile (AN) and N-vinylimidazole (VIM)

to form a copolymer. See, e.g., FIG. 1 of Yang '050 PCT Patent Application. Such scheme is also shown in FIG. 1A.

For example, in one embodiment, the solution polymerization of AN and VIM and other monomers were carried out in a 250 mL flask fitted with a thermocouple probe, condenser, addition funnel and nitrogen inlet. The flask was charged with DMF and purged with nitrogen for 30 minutes. Then the monomers, AIBN and chain transfer agent, 1-dodecanethiol were added drop wise into the flask over a period of 2-5 hours. The polymerization reactions were carried out at 70° C. with continuous stirring. The polymers were precipitated in de-ionized water, filtered and washed with methanol and hexane to remove residual monomers and then dried in vacuum oven for two days till constant weight was obtained.

82/18 ratio by weight AN/VIM copolymer precursor was ground into coarse granules in a grinder and these copolymer granules were vacuum dried at 65° C. for 3 hours. An Instron 3211 capillary rheometer was used to draw the fibers. In a typical trial, 9 g of copolymer was loaded in preheated rheometer at 180° C. under nitrogen atmosphere and left there to heat up for 10 minutes or less, after that drawing temperature was raised to 192° C.

In the present invention, the melt spinning of fibers was modified as follows: during the powderization and/or pelletization of the polymer, additives such as AIBN, peroxides, butylhydroxy toluene (BHT), or butylated hydroxyanisol (BHA), were added before extrusion was taken place. The typical drying and extrusion temperatures as disclosed and taught in Yang '050 PCT Patent Application may then be used for the fiber formation process.

Post extrusion, annealing is the process of aligning polymer chains while sequentially decreasing the fiber diameters. Typical annealing occurs at an elevated temperature from 110° C. to 130° C. Crosslinking of the fiber to impart higher strength during the stabilization process may be modified by the fiber finishing with peroxides, such as hydrogen or benzoyl peroxide. This may also be achieved by using a steam environment during annealing at these temperatures, thereby creating a high humidity during annealing.

Improved Stabilization

Figure 1B:
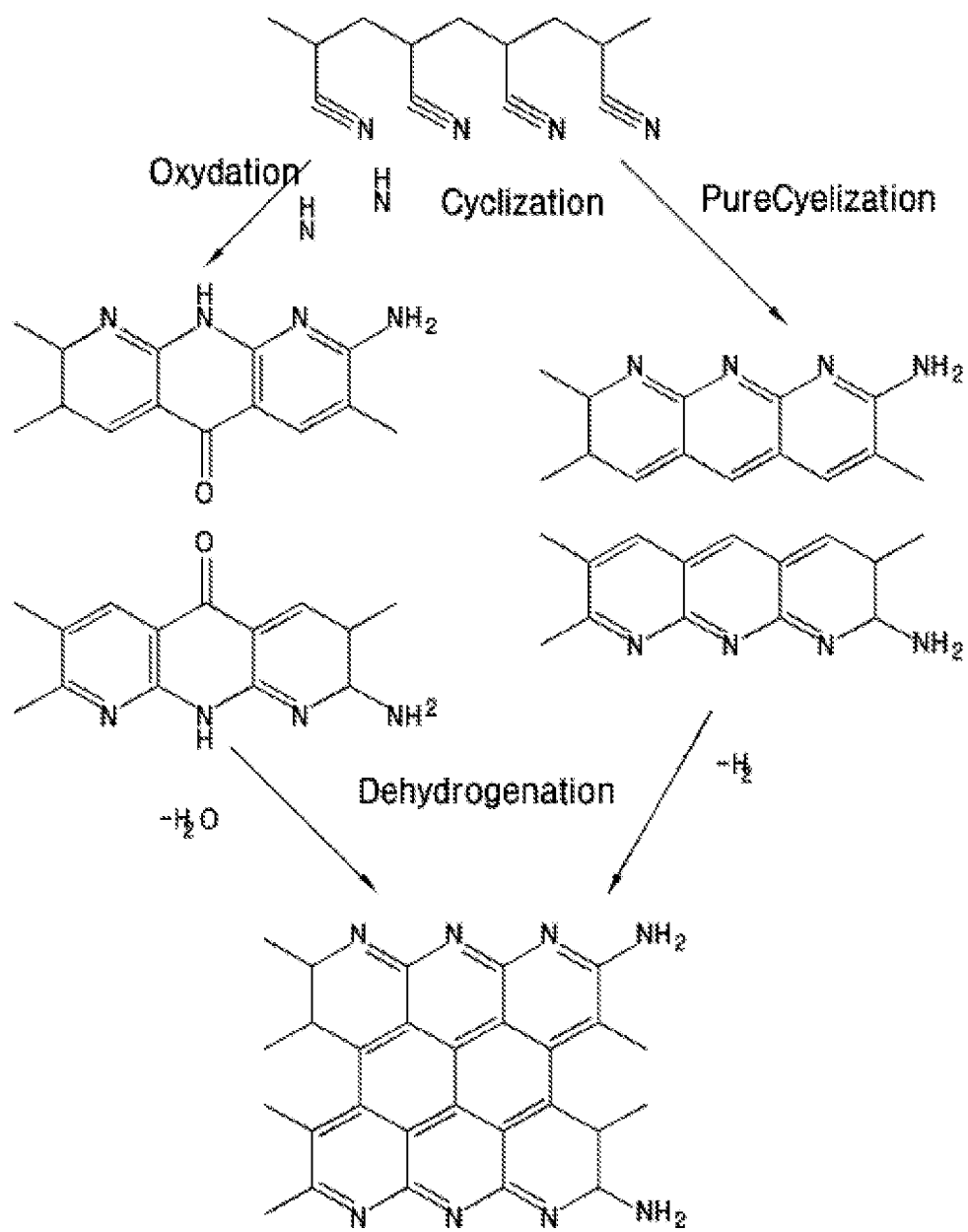
FIG. 1B shows the paths of polyacrylonitrile through stabilization (cyclization) to the final carbonized network.
Figure 2A:
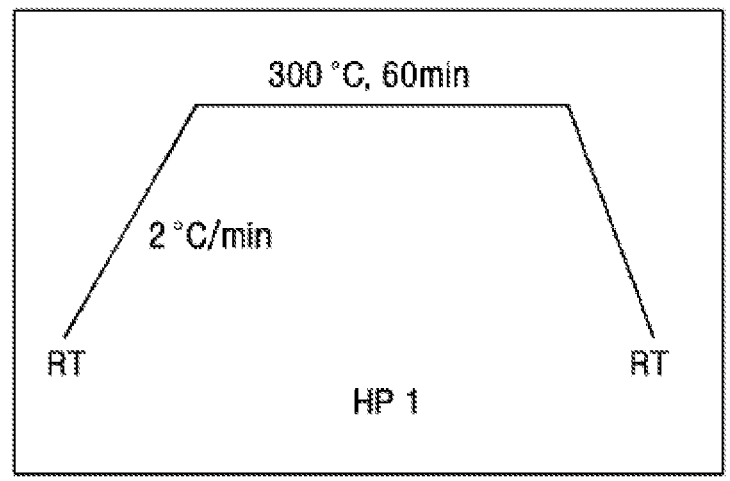
FIGS. 2A-2D are diagrams of stabilizing programs describing the temperature profiles for stabilized fibers.
Figure 2B:
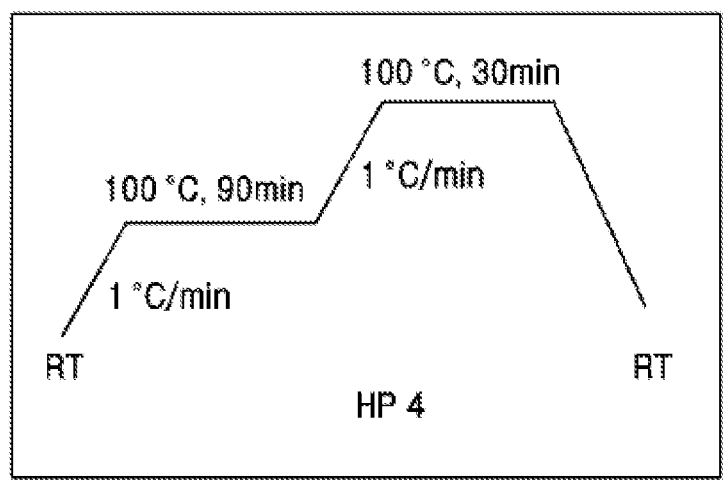
Figure 2C:
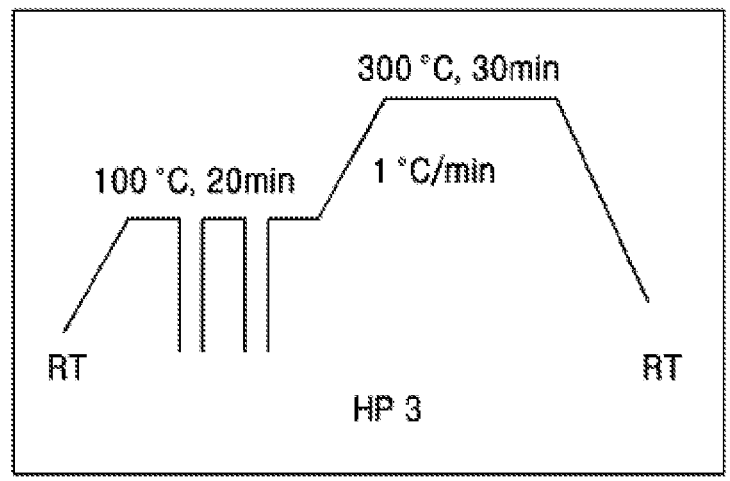
Figure 2D:
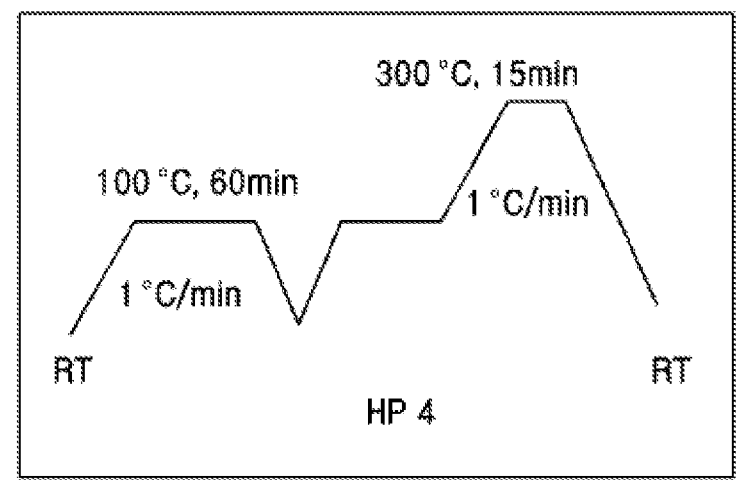
Figure 3:
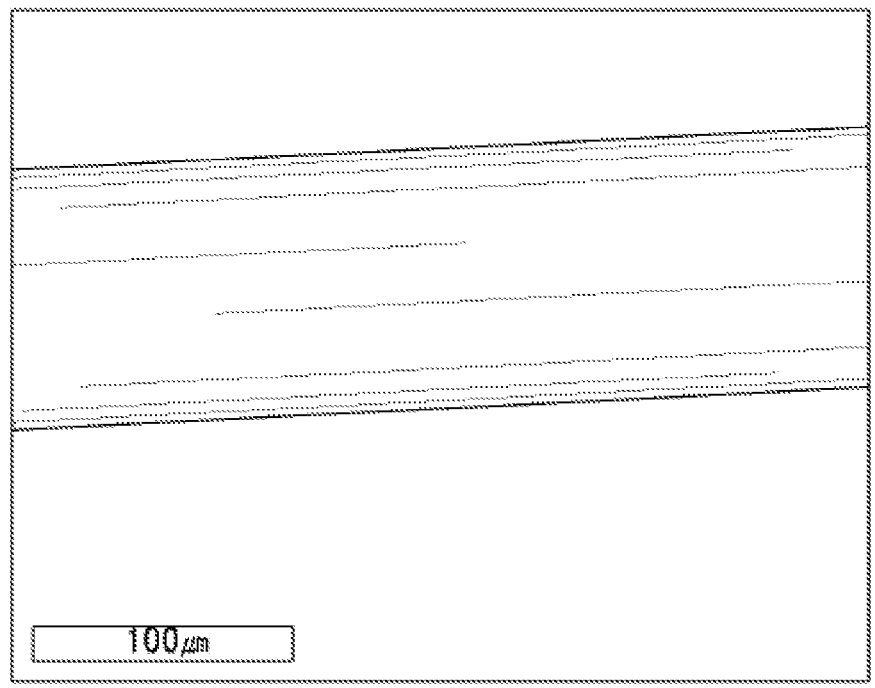
FIG. 3 is an optical microscopy of a stabilized AN/VIM copolymer fiber.
Figure 4A:
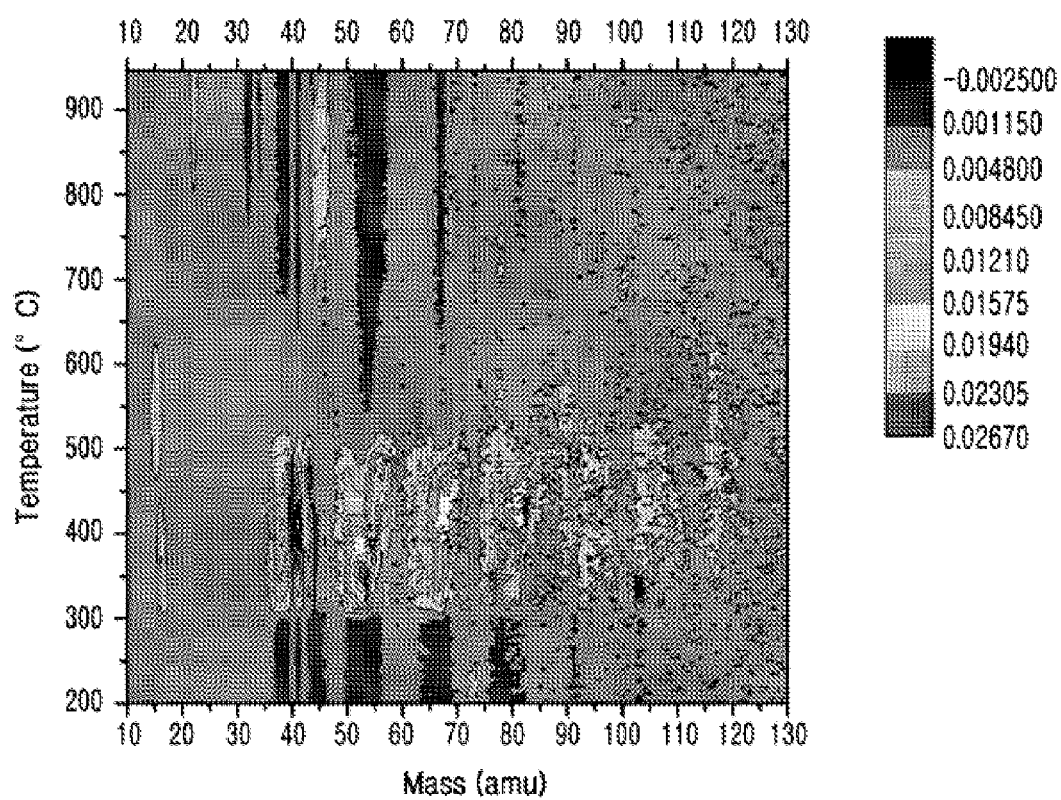
FIGS. 4A-4D are TGA-MS from 200° C. to 950° C. of (FIG. 4A) pure AN/VIM copolymer, (FIG. 4B) AN/VIM copolymer with AIBN, (FIG. 4C) AN/VIM copolymer with hydrogen peroxide, and (FIG. 4D) AN/VIM copolymer with benzoylperoxide additives.
Figure 4B:
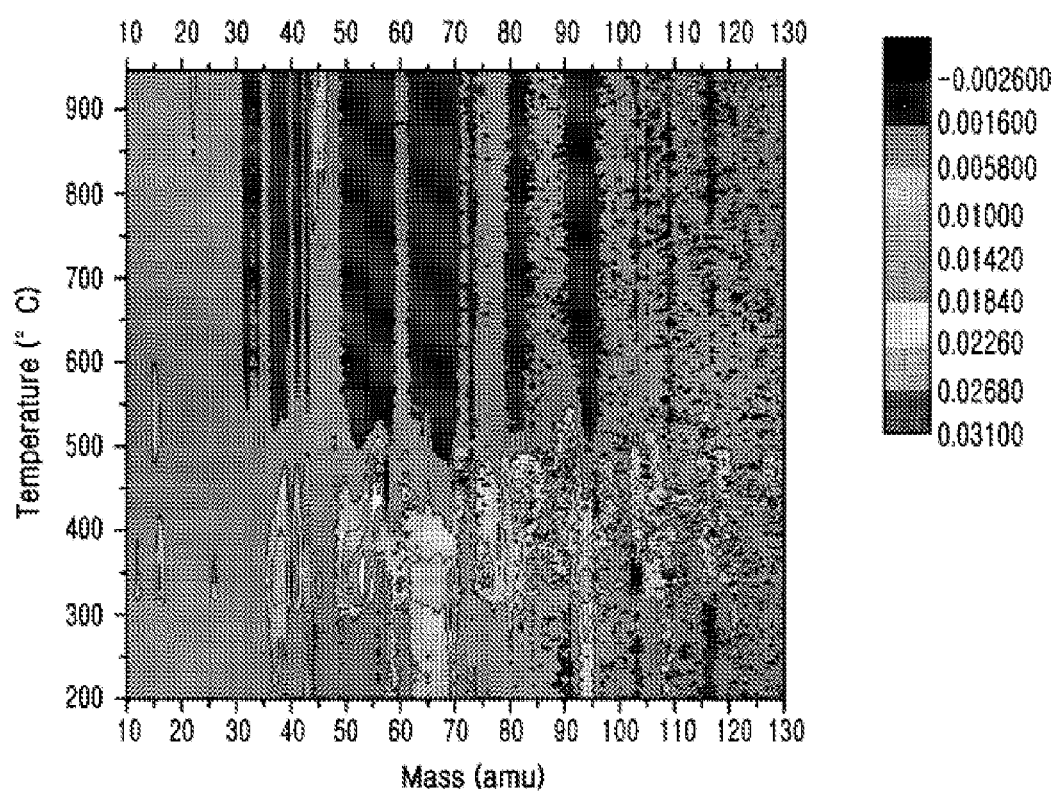
Figure 4C:
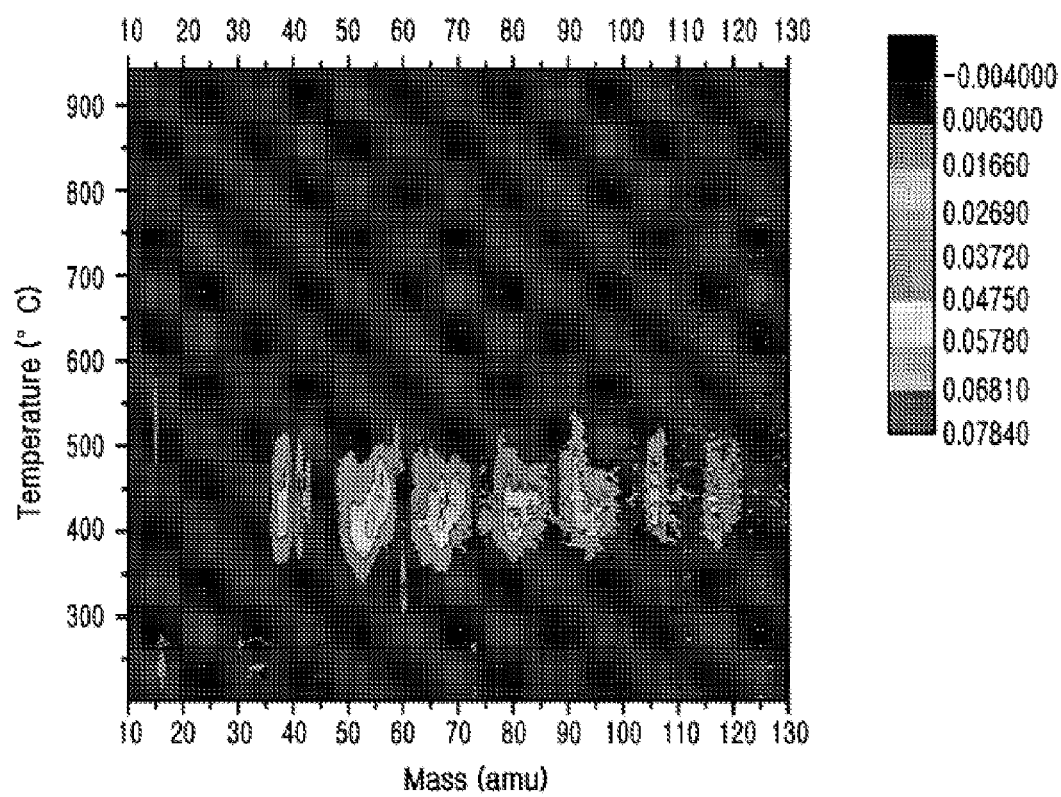
Figure 4D:
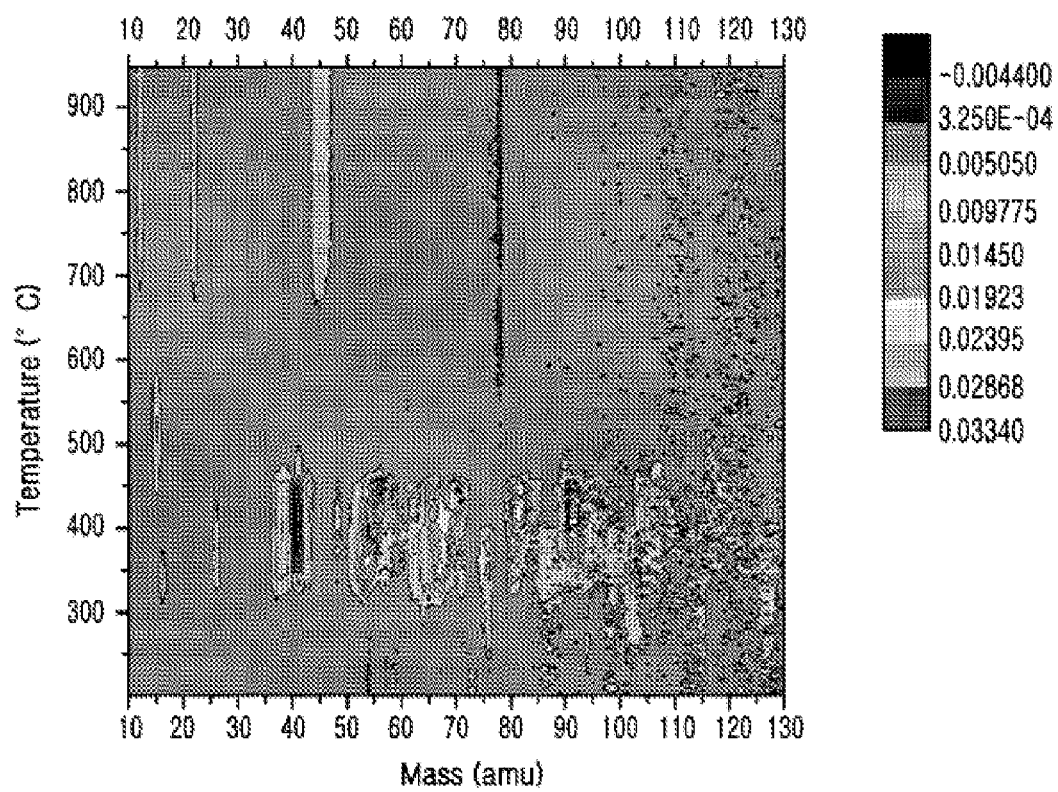
Figure 5A:
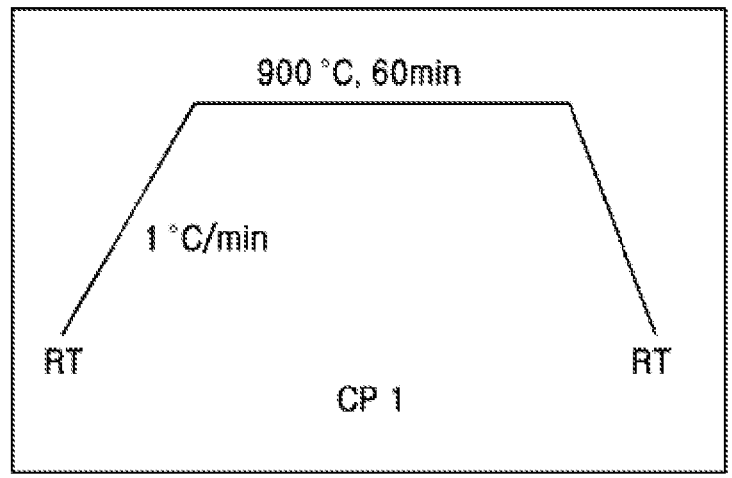
FIGS. 5A-5D are diagrams of carbonization programs describing the temperature profiles for carbonized fibers.
Figure 5B:
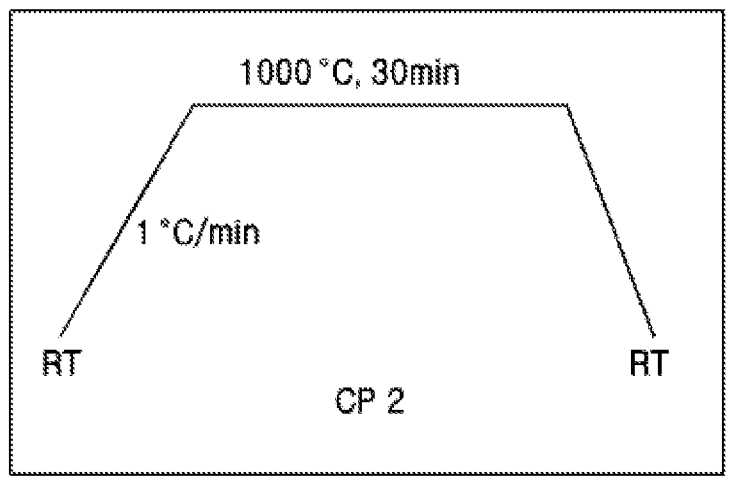
Figure 5C:
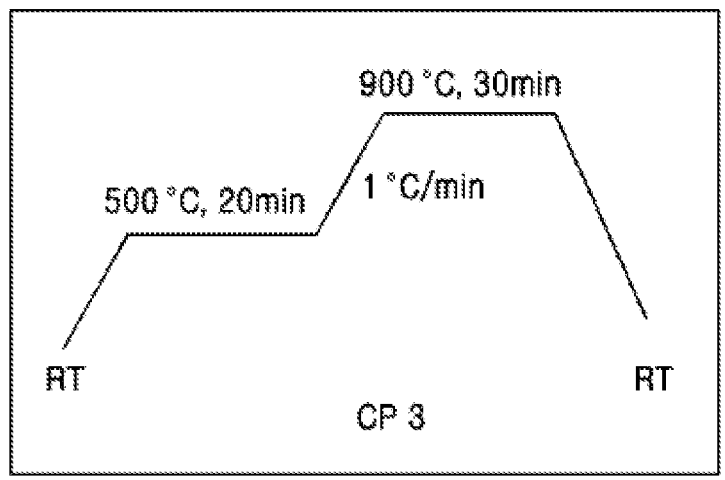
Figure 5D:
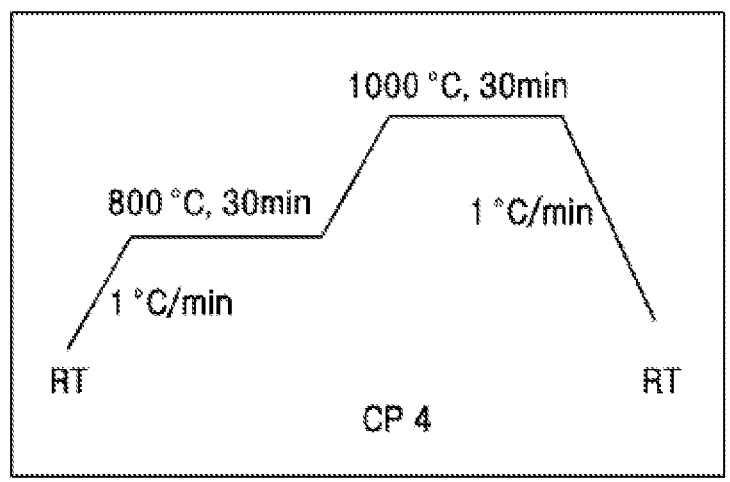

Stabilization is the step of cyclization of the acrylonitrile groups, as can be seen in FIG. 1B. Stabilization occurs through either the oxidative or pure cyclization routes. Both routes form a ladder polymer where the cyano functional groups will go through an interchain rearrangement.

Examples of heating programs for stabilization are shown in FIGS. 2A-2D, where the first heating program, HP1, goes directly to 300° C. at a step of 1° C. per minute, while HP2 has an original step at 150° C. for 30 minutes then to 300° C. at a step of 1° C. per minute. The program, HP2, was altered to a first step at 100° C. for an hour and half, instead of the original 30 minutes only, to allow for settling and initial oxidation of the polymer. Then the fiber was stepped up to 300° C. for 30 minutes only before cooling back down to room temperature.

It has been found that the heating program HP2 may be better for forming stabilized fibers. All fibers stabilized were performed with added tension of a weight at the end of the fiber during heating.

It has been discovered using the modified or precursor polymer with additives, the stabilization temperatures may be altered due to the additives. As FIGS. 4A-4D show, the addition of different additives may modify the stabilization temperatures of the fibers. FIGS. 4A-4D are TGA-MS from 200° C. to 950° C. of (FIG. 4A) pure AN/VIM copolymer, (FIG. 4B) AN/VIM copolymer with AIBN, (FIG. 4C) AN/VIM copolymer with hydrogen peroxide, and (FIG. 4D) AN/VIM copolymer with benzoylperoxide additives.

The typical stabilization temperature is at 300° C., while when combined with AIBN, the temperature drops to 250° C., increases with hydrogen peroxide to 350° C., then is a quicker (less time for stabilization) with benzoyl peroxide.

Improved Carbonization

Carbonization is the last step in the formation of carbon fiber, where the stabilized fiber is subjected to further heating. Examples of heating programs for carbonization are shown in FIGS. 5A-5D. Traditional programs for solution based acrylonitrile carbon fibers are shown as CP1 and CP2 (FIGS. 5A and 5B, respectively), where the temperature is ramped up to 900° C. and 1000° C. respectively. It has been seen that better results for carbonized fibers are the routes of CP3 and CP4 (FIGS. 5C and 5D, respectively) where an added isothermal step will allow for slower denitrogenation where there will be less pores and stronger fibers.

In embodiment of the present invention, the carbonization is modified by using the fibers with additives. One additive that has been found to have importance is the use of BHT (butylated hydroxytoluene). Other additives include peroxides (such as organic peroxides) and butylated hydroxyanisol.

Figure 6A:
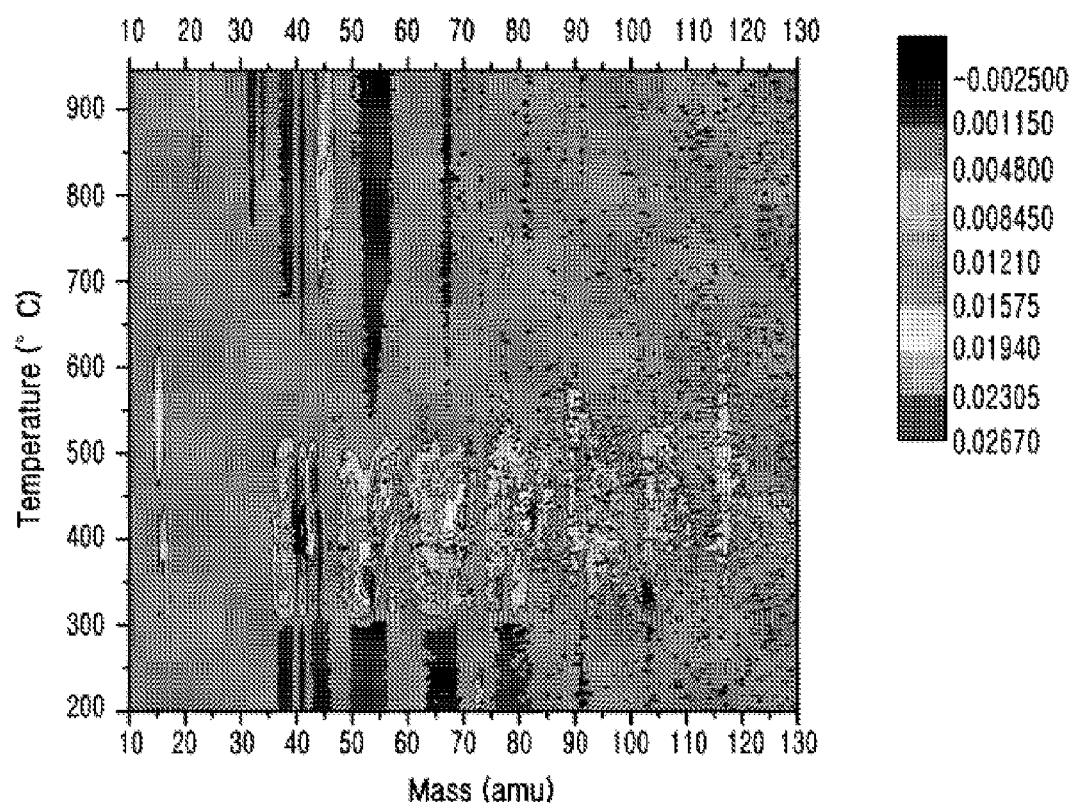
FIGS. 6A and 6B are TGA-MS of (FIG. 5A) AN/VIM, and (FIG. 5B) AN/VIM with BHT showing a drop in the carbonization temperature down to below 800° C.
Figure 6B:
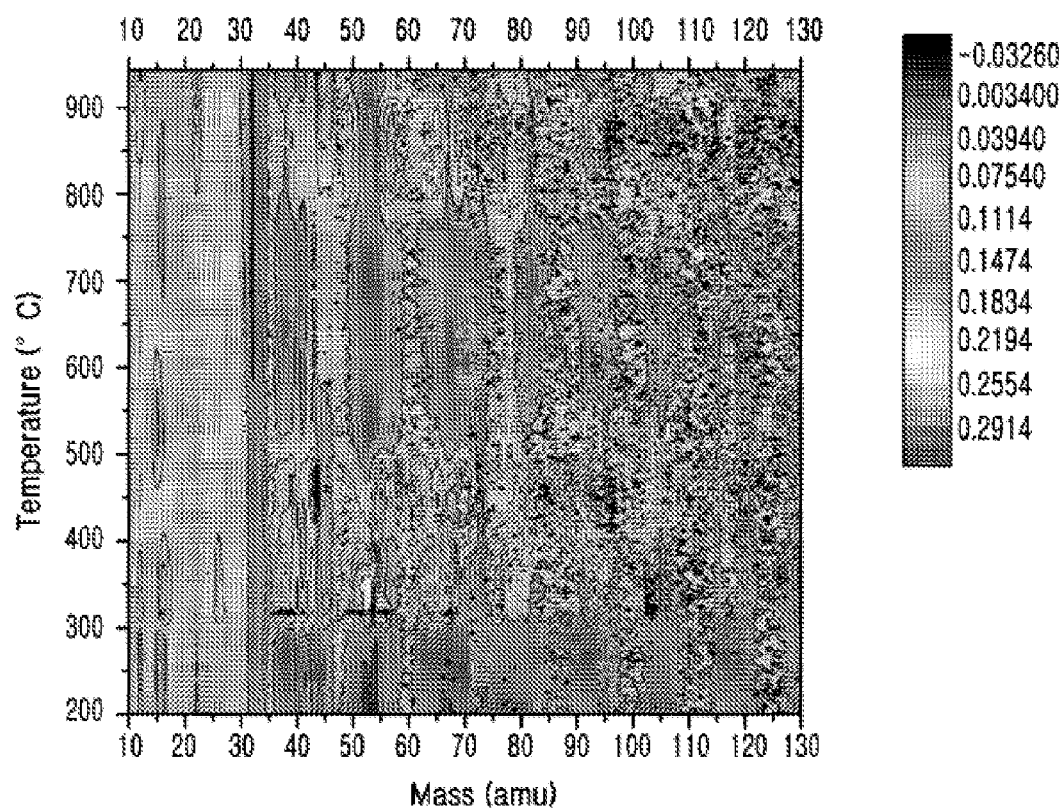

As can be seen from FIGS. 6A-6B, the addition of BHT drops the carbonization temperature from around 1000° C., which is typical for carbon fiber, to approximately 770° C. This drop in the carbonization temperature will drop the energy expenditure for forming carbon fiber products. This also has the potential for increased strength in the fibers because the carbonization can go through full completion at lower temperatures.

Figure 7:
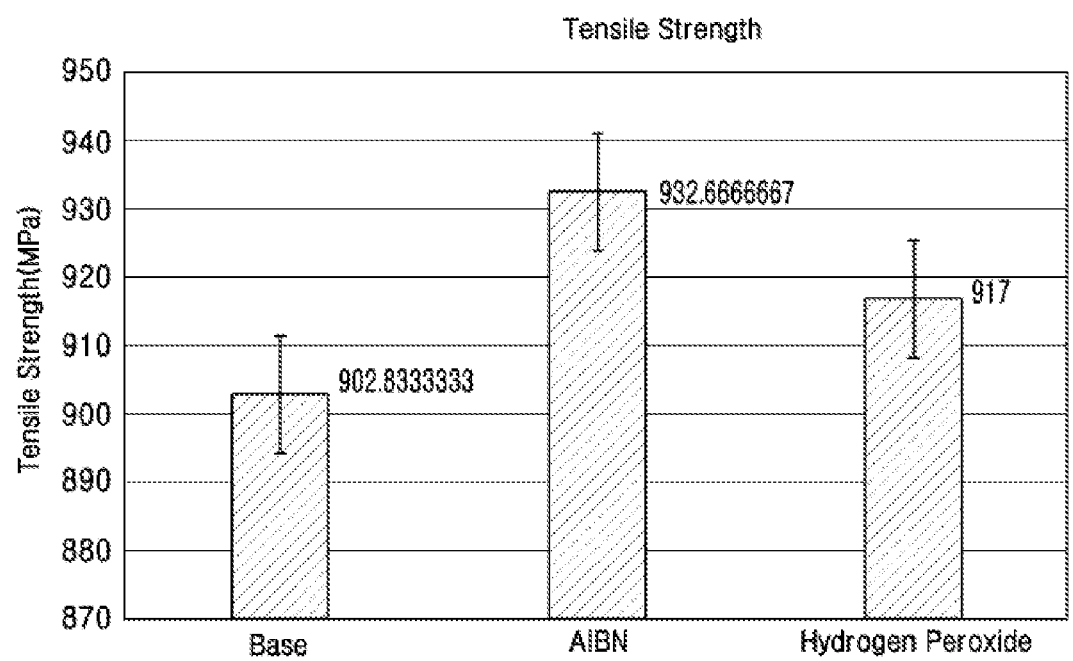
FIG. 7 is a graph showing tensile strength of carbonized fibers from base copolymer AN/VIM, the copolymer with AIBN additive, and the copolymer with hydrogen peroxide additive.
Figure 8:
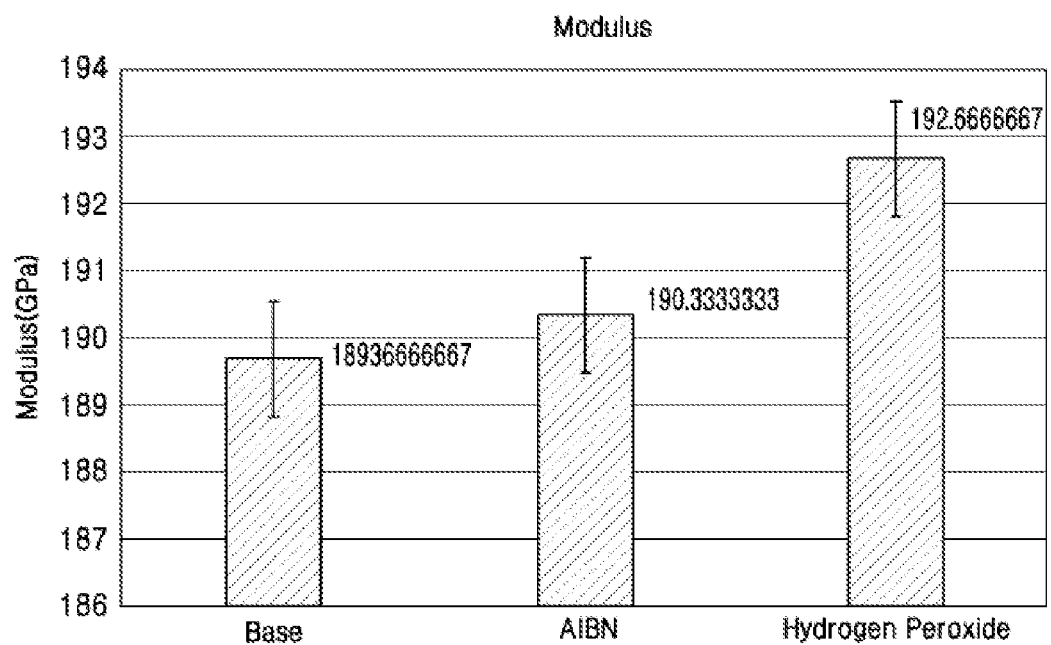
FIG. 8 is a graph showing modulus of carbonized fibers from base copolymer AN/VIM, the copolymer with AIBN additive, and the copolymer with hydrogen peroxide additive.

FIG. 7 shows a comparison of the tensile strengths of carbonized fibers from base copolymer AN/VIM, the base copolymer with AIBN additive, and the base copolymer with hydrogen peroxide additive. FIG. 8 shows a comparison of the moduli of carbonized fibers from base copolymer AN/VIM, the base copolymer with AIBN additive, and the base copolymer with hydrogen peroxide additive.

EXAMPLES

Example 1

A copolymer consisting of 80 wt % acrylonitrile and 20 wt % 1-vinylimidazole was created via solution polymerization in dimethylformamide at a temperature of 70° C. for 18 hours. The copolymer was precipitated in water and dried for 48 hours. The resulting copolymer was extruded at a temperature of 180° C. through a 0.5-inch hole to form continuous filaments. The filaments were drawn 2 times under constant tension and heating to 120° C. The filaments were then stabilized at 250° C. under constant tension for 2 hours. The stabilized fibers were carbonized at 1000° C. for 30 minutes. The resulting carbon fibers had the following properties: tensile strength of 700 MPa, and modulus of 135 GPa.

Example 2

A copolymer consisting of 80 wt % acrylonitrile and 20 wt % 1-vinylimidazole was created via solution polymerization in dimethylformamide at a temperature of 70° C. for 18 hours. The copolymer was precipitated in water and dried for 48 hours. The resulting copolymer was extruded at a temperature of 180° C. through a 0.5-inch hole to form continuous filaments. The filaments were drawn 2 times under constant tension and heating to 120° C. The filaments were dipped in a solution of 25 volume percent of hydrogen peroxide in distilled water and dried then processed through the same method one more time. The coated filaments were then stabilized at 250° C. under constant tension for 2 hours. The stabilized fibers were carbonized at 1000° C. for 30 minutes. The resulting carbon fibers had the following properties: tensile strength of 790 MPa, and modulus of 155 GPa.

Example 3

A stabilized fiber as obtained from Example 1 was dip coated in a solution of 25 wt % of butylated hydroxytoluene in distilled water and dried then processed through the same method one more time. The coated stabilized fibers were carbonized at 1000° C. for 30 minutes. The resulting carbon fibers had the following properties: tensile strength of 958 MPa, and modulus of 175 GPa.

Example 4

A copolymer consisting of 80 wt % acrylonitrile and wt % 1-vinylimidazole was created via solution polymerization in dimethylformamide at a temperature of 70° C. for 18 hours. The copolymer was precipitated in water and dried for 48 hours. The resulting copolymer was crushed up and dry mixed with 10 wt % of azobisisobutyronitrile. The dry mixture was extruded at a temperature of 180° C. through a 0.5-inch hole to form continuous filaments. The filaments were drawn 2 times under constant tension and heating to 120° C. The drawn filaments were then stabilized at 250° C. under constant tension for 2 hours. The stabilized fibers were then carbonized at 1000° C. for 30 minutes. The resulting carbon fibers had similar properties as those of Example 2.

Example 5

A stabilized fiber as obtained from Example 4 was dip coated in a solution of 25 wt % of butylated hydroxytoluene in distilled water. The coated stabilized fibers were carbonized at 1000° C. for 30 minutes. The resulting fiber had similar properties as those of Example 3.

Modes of Additive Manufacturing

The modes in which the additive can be added into the fiber synthesis process include:
(1) Combination in dry blend during pelletization before extrusion. Melt-spun (also known as extruded) fibers will have the additives all throughout the inside and outside of the fibers.
(2) Fiber finishing, or dip coating the extruded fibers with a solution of an additive, such as the additives of peroxides or AIBN, before stabilization.
(3) Fiber finishing, or dip coating stabilized fibers with an additive solution, such as a solution of BHT or BHA additives, before carbonization.

The invention claimed is:
1. A method for formation of fibers of co-polymers comprising acrylonitrile and a vinyl imidazole co-monomer, wherein the method comprises the steps of:
(a) combining acrylonitrile with the vinyl imidazole co-monomer to form a co-polymer composition;
(b) melt-spinning the composition to form melt-spun fibers of the composition;
(c) annealing the melt-spun fibers to form annealed fibers;
(d) stabilizing the annealed fibers to form stabilized fibers; and
(e) carbonizing the stabilized fibers to form carbon fibers, wherein
(i) an additive is added during the method and changes a characteristic of the fibers selected from the group consisting of
(A) decrease stabilization temperature of the annealed fibers by the range of from 1° C. to 50° C. as compared to the stabilization temperature of the annealed fibers, in which the annealed fibers would have had without the additive,
(B) decrease carbonization temperature of the stabilized fibers by the range of from 10° C. to 200° C. as compared to the carbonization temperature of the stabilized fibers, in which the stabilized fibers would have had without the additive, and
(C) combinations thereof, and
(ii) the additive is added by dip coating the stabilized fibers of the stabilizing step with the solution of the additive before the carbonizing step.

2. The method of claim 1, wherein the additive comprises a material selected from the group consisting of peroxides and radical initiators.

3. The method of claim 2, wherein the additive is selected from the group consisting of benzoyl peroxide and AIBN.

4. The method of claim 1, wherein the acrylonitrile is at least 70 wt % of the composition and the co-monomer is up to 30 wt % of the composition.

5. The method of claim 1, wherein the co-monomer is selected from the group consisting of 1-vinyl imidazole, 4-vinyl imidazole, 2-vinyl imidazole, and 1-methyl-2-vinyl imidazole.

6. The method of claim 1, wherein the method further comprises adding a plasticizer, and the plasticizer is an oligomer of acrylonitrile-co-methyl-1-imidazoleacrylate.

7. The method of claim 1, wherein the melt spinning is carried out at 100° C. to 200° C. in an inert atmosphere.

8. The method of claim 1, wherein the annealing is carried out at 100° C. to 150° C. under tension.

9. The method of claim 1, wherein the method further comprises a plasticizer, and the plasticizer is from 5 wt % to 10 wt % of the composition.

10. The method of claim 1, wherein the method further comprises a plasticizer, and the plasticizer is an oligomer of acrylonitrile-co-N-imidazole acrylate having a molecular weight ranging from 1,000 Daltons to 2,000 Daltons.

11. A carbon fiber composition formed by the method of claim 1.

12. The method of claim 1, wherein a second additive is added in the dry blend during powderization and/or pelletization before the extrusion of the melt-spun fibers in the melt-spinning step.

13. The method of claim 1, wherein the additive comprises a peroxide.

14. The method of claim 13, wherein the peroxide is benzoyl peroxide.

15. The method of claim 1, wherein the additive is selected from the group consisting of butylhydroxy toluene (BHT), or butylated hydroxyanisol (BHA).

* * * * *